Figure 1:
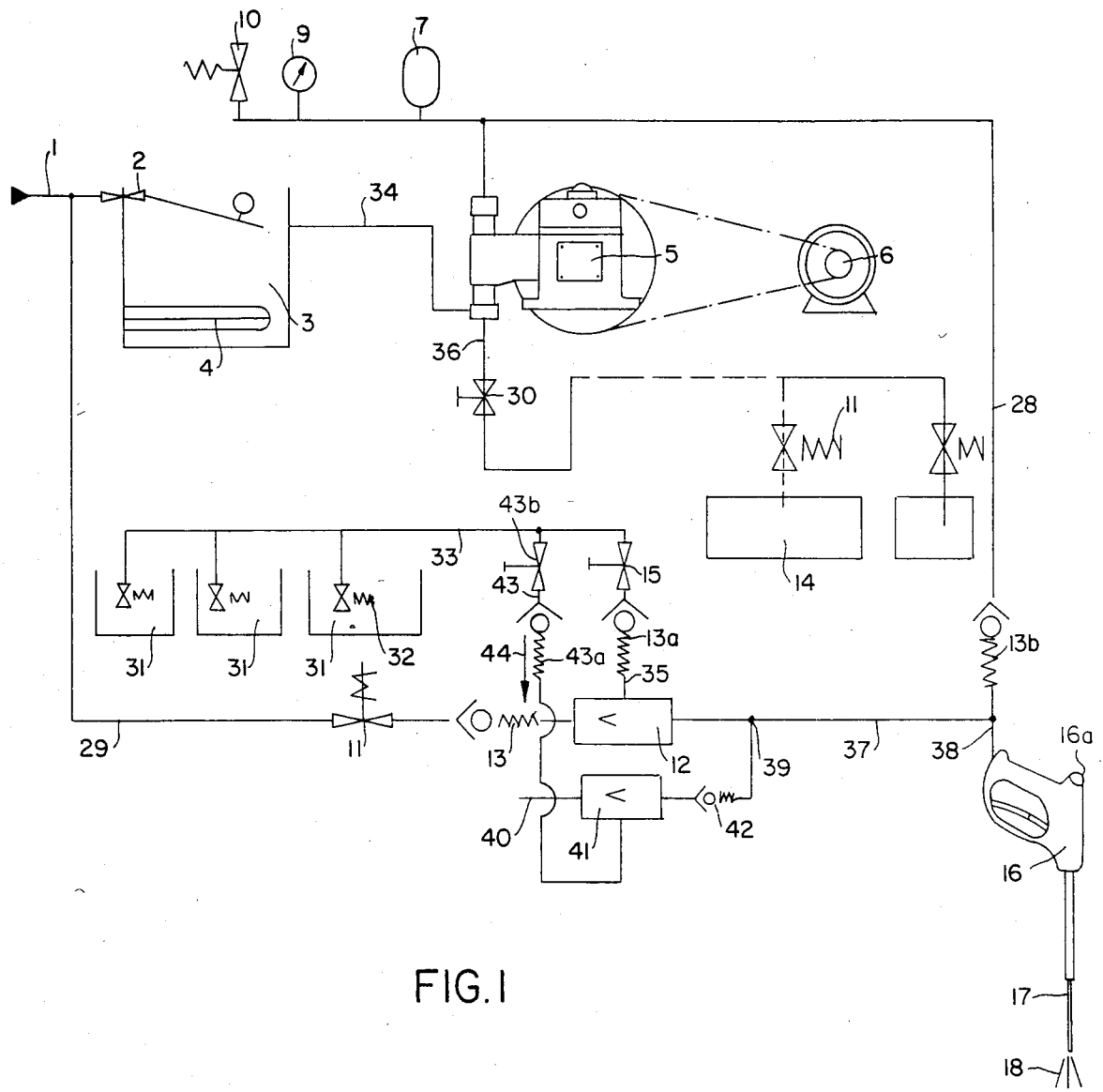

United States Patent [19]

Oberdorfer

[11] Patent Number: 4,569,483
[45] Date of Patent: Feb. 11, 1986

[54] APPARATUS FOR CLEANING OBJECTS BY SPRAYING

[76] Inventor: Guido Oberdorfer, Oberdorfer-Strasse 11-16, D-7919 Bellenberg, Fed. Rep. of Germany

[21] Appl. No.: 720,061
[22] PCT Filed: Sep. 4, 1981
[86] PCT No.: PCT/EP81/00144
  § 371 Date: May 5, 1982
  § 102(e) Date: May 5, 1982
[87] PCT Pub. No.: WO82/00783
  PCT Pub. Date: Mar. 18, 1982

Related U.S. Application Data

[63] Continuation of Ser. No. 377,207, May 5, 1982, abandoned.

[30] Foreign Application Priority Data

Sep. 6, 1980 [DE] Fed. Rep. of Germany ....... 3033622
Sep. 15, 1980 [DE] Fed. Rep. of Germany ....... 3034769

[51] Int. Cl.⁴ .......................... B08B 3/02; B60S 3/04
[52] U.S. Cl. .................................. 239/305; 137/569; 239/307
[58] Field of Search ............... 239/124, 135, 304, 305, 239/307; 137/334, 341, 569

[56] References Cited

U.S. PATENT DOCUMENTS

| 1,658,473 | 2/1928 | Ackerman | 239/307 X |
| 3,322,350 | 5/1967 | Heinicke et al. | 239/307 X |
| 3,556,402 | 1/1971 | Wolking | 239/304 X |
| 3,720,226 | 3/1973 | Minich, Jr. et al. | 137/334 |
| 3,797,744 | 3/1974 | Smith | 239/305 X |

*Primary Examiner*—Andres Kashnikow
*Attorney, Agent, or Firm*—Paul H. Gallagher

[57] ABSTRACT

The apparatus uses a low pressure water stream, from a tap source, into which chemicals can be selectively introduced, and a high pressure water stream produced by a pump, into which chemicals can be selectively introduced, and an air stream into which chemicals can be selectively introduced. A heated water supply provides water for the high pressure stream. All the streams lead to a single spray pistol, the spray pistol having control switches for controlling the lines and chemicals.

3 Claims, 2 Drawing Figures

APPARATUS FOR CLEANING OBJECTS BY SPRAYING

This application is a continuation of U.S. Ser. No. 377,207 filed May 5, 1982, now abandoned.

A principal object of the invention is to provide apparatus for cleaning objects in industry, as in service stations, in shipping, as well as in agriculture and household areas, by which the object to be cleaned is washed by means of a spray pistol and fluid streams mixed with cleaning and servicing chemicals.

Apparatus of this general kind has taken various forms in the past, and herein a high pressure stream is utilized, drawn by a pump from a heated water supply and with which chemicals are mixed, and the resulting mixture is sprayed from a spray pistol (spray lance). This high pressure stream is of low mass and has a strong effect of removing dirt due to its high pressure.

Heretofore in order to achieve a good cleaning effect, a very high temperature of the water stream was necessary, which would entail a considerable amount of heat. The water used was warmed or heated by suitable means. In the use of a high pressure stream, there was insufficient time for the chemicals to penetrate the dirt to be removed. Also because of the high velocity of the stream, an electrostatic charge would develop on the object to be cleaned, and the cleaning result would be impaired.

It has also heretofore been known to utilize a water tube, with a wash brush and shampoo rods, to cleanse the object and to provide chemicals by means of a special pump or equivalent means.

A disadvantage of such a pump though is that strong chemicals cannot be used, and when changing from one object to another, the entire spray tube must be emptied and cleaned, which entailed a great amount of valuable time, and relatively expensive chamicals would be wasted. There is the further disadvantage that water soluble cleaning means are available only in concentrated form and must be thinned before use.

The present invention provides apparatus and method which are extremely effective with less effort and can go from a low pressure operation to a high pressure operation, and be operated substantially more effectively and inexpensively than high pressure cleaning, or low pressure cleaning taken by itself.

In carrying out the present invention several working stages are utilized: in a first stage a low pressure stream of water is utilized, from the general supply or community supply; in a second stage the low pressure is shut off and the chemicals are permitted to penetrate the dirt to be removed; and in a third stage the chemicals are washed off with a high pressure stream.

The present invention utilizes a combination of low pressure and high pressure, in which a low pressure step is added to a high pressure step. This has the advantage that the chemicals are applied with low pressure, which results in sparingly applying the chemicals on the object to be cleaned. The low pressure stream is shut off after the chemicals are applied in the second stage, so that the chemicals can penetrate the dirt to be removed for a longer time. Thereafter, the high pressure cleaning is resumed and in this the third stage, the chemicals are washed off with the high pressure stream. This assures complete elimination of the chemicals, and the high pressure stream itself, without the chemicals, performs a further cleaning effort.

In the present invention, the combination of the low pressure and high pressure stages, perform an effect far superior to previously known procedures.

The present invention also encompasses a fourth stage in which water remaining on the object being cleaned from the high pressure stream, is blown off with air pressure. This step is of special importance in such operations as cleaning motors, ignition distributors, spark plugs, and other water sensitive items.

A further advantage of the invention is that in utilizing an air stream, additional chemicals can be introduced, such as spray wax, felloe cleaners, insect repellents, etc. This step deals with chemicals that are effective for cleaning, in air, without the use of water.

The apparatus, utilizing a combination of low pressure and high pressure cleaning steps, and alternatively with air cleaning steps, has the advantage that a considerably lower temperature (c.45° C.) can be utilized, and smaller amounts of water are used, and that with lesser pressures. The apparatus therefore results in conserving energy and there is not so great a demand on the operator for the exact execution of the spray stream, as was previously the case with high pressure cleaning, since the dirt is already loosened by the previous low pressure cleaning.

The apparatus has the further advantage that it is ideally suited for self service operation (coin operated), since it can be readily operated by unskilled operators.

In order to accommodate strong chemicals, instead of using pumps, injectors may be used. The chemicals are provided in a plurality of containers, in order to accommodate different kinds of chemicals. Drawing in the chemicals into the fluid streams is controlled by magnetically operated valves, and the use of injectors for drawing in chemicals enables stronger chemicals to be used, that could not ordinarily be accommodated by pumps.

The magnetically operated valves, for controlling the drawing in of chemicals may be controlled by selection switches mounted on the handle of the spray pistol. Such control may be wireless, or remote control, or by using conductors.

In order that expensive and time consuming cleaning of conduits is avoided, in changing from one chemical to another, the apparatus includes chemical ducts or passages feeding directly into the spray pistol in a common suction conduit, so that in changing from one chemical to another, it may be done quickly, instead of opening one duct after another, in an expensive cleaning or emptying of the previously used chemical duct.

DESCRIPTION OF CERTAIN PREFERRED EMBODIMENTS

Figure 2:
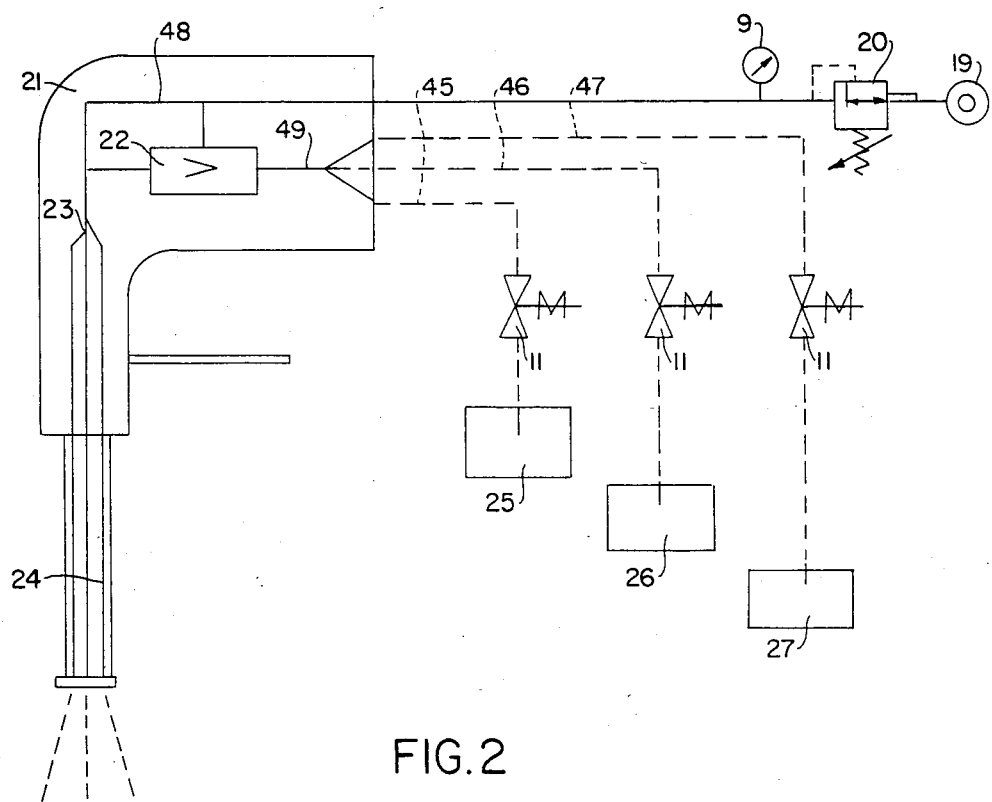

In the drawings,

FIG. 1 is a diagram of the apparatus including high pressure, low pressure, and air phases; and FIG. 2 shows a modified form of spray pistol, and diagram of related components of the apparatus.

FIG. 1 shows a float valve 2 in a water supply 1, controlling the water level in a boiler 3, the latter having an electrical heating rod 4. Preferably the water temperature is maintained at 45° C. by means of a thermostat. Upstream from the float valve 2 is a branch line 29, constituting a low pressure duct or line, through which the water is fed from the water supply 1 into the low pressure phase of the apparatus, while a duct 34 is utilized for supplying water from the boiler 3 to the high pressure pump 5. The low pressure line 29 includes a magnetic valve 11 controlled by an activating switch which may be at a convenient place in the housing of the apparatus, or directly on the handle of the spray pistol 16 as indicated at 16a.

The low pressure line 29 includes, at a position downstream from the valve 11, a back pressure or check valve 13, and then leads to an injector 12. The back pressure valve 13 operates to hold a high pressure fluid from a high pressure line 28, from backing into the low pressure line 29 and then into the water supply.

The injector 12 develops a lowered pressure in the line 35 which includes a back pressure valve 13a and a metering valve 15, leading from a line 33, the latter having a plurality of branches including magnetic valves 32 in a plurality of containers 31 containing the chemicals to be utilized. These branch lines include magnetic valves 32. In this case also these valves may be controlled by selection switches positioned at a suitable location, such as on the handle of the spray pistol 16 as at 16a.

In the injector 12 the chemical that is drawn from the selected container 31 is mixed with the low pressure water stream and supplied to the line 37 and the joining line 38 of the spray pistol. The handle of the spray pistol includes a shut-off valve, and upon that valve being opened, the stream is sprayed through the spray pipe 17 and nozzle 18.

The apparatus also includes a high pressure phase which includes the high pressure pump 5 which draws warmed water from the boiler 3 through the line 34. At the suction side of the pump 5 is a line 36 which includes a metering valve 30, and through this line 36 chemicals are drawn out of a container 14, this line including magnetic valves 11 controlled by switches at suitable locations.

Instead of using separate chemical containers 14 and 31, a single such container may be used, with the suction line 36 connected with the suction line 33.

The chemicals drawn in through the suction line 36 are mixed with the water stream drawn in through the line 34, and the pump 5 develops a high pressure water stream and forces it through the high pressure line 28, and the back pressure valve 13b, and then to the spray pistol 16. The back pressure valve 13b prevents the fluid from the low pressure line 37 from entering into the line 28.

The high pressure line 28 includes a safety valve 10, a manometer 9 and a water depository 7. The high pressure pump 5 is driven by an electric motor 6.

By means of the confluence of the high pressure line 28 with the low pressure line 37, at the spray pistol 16, it is consequently possible with a single spray pistol, to form a low pressure stream of great volume and a high pressure stream with relatively small volume.

Another feature of the invention is that air pressure can be used in the low pressure phase of the apparatus. The low pressure line 37 includes a T-piece 39 from which a branch line leads, including a back pressure valve 42 at the outlet of an injector 41. At the inlet of the injector 41 air pressure is supplied through a connector line 40. A suction line 43 includes a reverse pressure valve 43a and a metering valve 43b, and the chemicals are drawn out of the containers 31, selectively in the direction of the arrow 44.

This air stream, including the chemicals mixed therein, is fed through the spray pistol 16, and by means of the air stream itself with the chemicals being cut off, the lines can be blown clean upstream of the T-piece 39, the air stream continuing through the spray pistol and the nozzle 18 thereof, and blowing water residue from the object being cleaned.

A modified form is shown in FIG. 2, which includes an air pressure driven spray pistol 21. In this arrangement an additional line 38 wherein a high pressure water stream, as well as the low pressure water stream, can be directed to the pistol 21. Additionally, this arrangement provides for an air pressure stream with chemicals therein.

Consequently, the spray pistol 21 shown in FIG. 2 is capable of spraying a water stream with chemicals mixed therein, or an air stream with chemicals mixed therein.

In the operation of the apparatus shown in FIG. 2, an air stream is fed through the conductor 19, and it flows through a pressure reducer 20 and a manometer 9. An injector 22 is built in in the handle of the pistol and is capable of mixing chemicals in the air stream or water stream. A short distance upstream of the injector are suction lines 45, 46, 47, through which the chemicals are supplied from the supply containers, 25, 26, 27, as controlled by the magnetic valves 11.

Upon actuation of magnetic valves 11, the corresponding chemicals are drawn from the containers by the injector 22, this arrangement eliminating previously known techniques which included a complicated set of steps for emptying and cleaning the suction lines. This arrangement provides an extremely great advantage in spraying of expensive chemicals, in that they can be accurately controlled and used sparingly, and excess chemicals eliminated.

The air pressure stream in the line 48 provides a confining effect in preventing an excessive spreading out of the air pressure stream emaniting from the spray pipe 24. The line 49, into which the suction lines 45, 46, 47, feed, is made of short length, to minimize loss of chemicals passing through the lines.

As in the case of the apparatus of FIG. 1, the magnetic valves 11 may be controlled by a switch mounted in the handle of the spray pistol 21, or by a switch at any appropriate location in the apparatus.

I claim:

1. Cleaning apparatus for use with a common low pressure water supply, container means for chemicals, and a spray pistol for spraying materials onto objects to be cleaned, comprising, a high pressure line leading from the water supply to the spray pistol, pump means for developing high pressure in the high pressure line, and for drawing chemicals from said container means into the high pressure line, a low pressure line leading from the water supply to the spray pistol in bypassing relation to the high pressure line, injector means operable, in response to the flow of water in the low pressure line, for introducing chemicals from said container means into the low pressure line, and the low pressure line being substantially free of instrumentalities, other than said injector means, and thereby operable for conducting water therethrough at substantially the low pressure of the water supply, means for selectively controlling the introduction of chemicals into the lines respectively, and independently of said pump means, and check valve means in the lines between the points of introduction of the chemicals into the lines, respectively, and the spray pistol.

2. Cleaning apparatus according to claim 1 for use also with a compressed air supply, and including, an air line leading from the air supply to the spray pistol in bypassing relation to the high pressure line and the low pressure line, injector means operable in response to the flow of air in the air line, for introducing chemicals from said container means into the air line, means for selectively controlling the introduction of chemicals into the air line independently of the high pressure line and the low pressure line, and check valve means in the air line between the point of introduction of chemicals into the line and the spray pistol.

3. Cleaning apparatus according to claim 1, wherein, at least one of said lines, constituting fluid lines, leads into the interior of the spray pistol, the apparatus includes a plurality of chemical lines leading from the chemical containers into the interior of the spray pistol, and the spray pistol includes means operable for drawing chemicals through the chemical lines in response to flow of fluid through the fluid line, whereby the chemicals are mixed with the fluid and the resulting mixture is sprayed from the spray pistol.

* * * * *